United States Patent [19]

Germino et al.

[11] Patent Number: 4,671,963
[45] Date of Patent: Jun. 9, 1987

[54] STEARATE TREATED FOOD PRODUCTS

[76] Inventors: Felix J. Germino, 12414 83rd Ave., Palos Park, Ill. 60464; Vincent V. Amato, 7 Alder St., Matawan, N.J. 07747

[21] Appl. No.: 753,312

[22] Filed: Jul. 9, 1985

Related U.S. Application Data

[63] Continuation-in-part of Ser. No. 546,323, Oct. 28, 1983, abandoned.

[51] Int. Cl.$^4$ .................... A21D 15/08; A21D 13/00; A23G 9/00; A23B 9/00
[52] U.S. Cl. ........................................ 426/89; 426/93; 426/94; 426/96; 426/101; 426/103; 426/289; 426/293; 426/310
[58] Field of Search ............... 426/89, 93, 94, 95, 96, 100, 101, 302, 305, 289, 293, 310

[56] References Cited

U.S. PATENT DOCUMENTS

| | | | |
|---|---|---|---|
| 2,279,203 | 4/1942 | Musher | 426/93 |
| 2,468,078 | 4/1949 | Kelly | 426/93 |
| 2,824,009 | 2/1958 | Lindow | 426/93 |
| 3,784,714 | 1/1974 | McReynolds et al. | 426/171 |

OTHER PUBLICATIONS

Hawley, The Condensed Chemical Dictionary, 8th Ed., 1971, Van Nostrand Reinhold Co., N.Y.

*Primary Examiner*—Raymond N. Jones
*Assistant Examiner*—Marianne M. Cintins
*Attorney, Agent, or Firm*—Welsh & Katz, Ltd.

[57] ABSTRACT

A method for treating foodstuffs with alkaline metal salts of stearic acid by coating and/or by inclusion within the food product is disclosed. The food may be coated by immersion or spraying of a stearate dispersed in a carrier fluid onto the food. The total amount of stearate in the food product should be between 2% and 8% by weight. On heating, the stearate forms a substantially continuous film over and within the food, which retains the original texture of the coated food in the presence of moisture.

17 Claims, No Drawings

STEARATE TREATED FOOD PRODUCTS

This is a continuation-in-part of application Ser. No. 546,323 filed Oct. 28, 1983, now abandoned.

This application relates to food products in general and more specifically, to a coated food product and a method for preparing such a coated food product which will retain its textural character in the presence of moisture.

Food products which are normally crunchy in nature and have a firm texture and chewy nature when fresh and recently prepared, have a tendency to become soggy and suffer a loss of texture through the passage of time and exposure to moisture-laden air. Good packaging techniques can generally extend the shelf life of such products. However, once the package is opened, a food product with a chewy texture and/or crunchy characteristic begins deteriorating immediately. Measures such as the addition of amounts of sucrose and other sugar alcohols to a granola mixture could, if mixed in the right proportions, retain the chewy characteristics of a granola mix bar for some time. However, such formulations are ineffective in the retention of the crunchy characteristics of individual food particles in a mixture of other foodstuffs having contrasting characteristics. Thus, a food product with dual texture characteristics is not possible by the teachings of the prior art.

In attempting to prolong the shelf life and original character of various food products, many different coatings have been attempted. Foods have been coated with oil, dough, sugar, and fats, among other coatings. All of the above have been found unsatisfactory for one reason or another but primarily because of discontinuities in the film formed on the object being coated. In general, these coatings are permeable to moisture, non-hydrophobic and merely delay the change in textural characteristics by only a short time at best.

SUMMARY OF THE INVENTION

Therefore, an object of the subject invention is a method for coating foodstuffs or food products in a manner which will maintain the crunchy and chewy textural characteristics of a food product in the presence of moisture.

Another object of the subject invention is a method of developing within grains the crunchy character of nuts.

Yet another object of the subject invention is a coated food product such as grains and nuts which are insensitive to water.

A still further object of the subject invention is a coating composition which, when applied to food product provides a crunchy, chewy character to the food product.

Further objects are attained in accordance with the present invention wherein there is provided a coating composition and a method for applying that coating composition to food products such as grains and nuts, which coating composition provides a measure of insensitivity to moisture in a food product. A continuous film or coating of an alkaline metal salt of stearic acid such as zinc stearate, calcium stearate, or magnesium stearate is applied to the food product, such as nuts and grain, in a manner which retains the original texture of that food product in the presence of moisture. Surprisingly enough, the taste of the original food product is not affected by the coating when the coating comprises less than 8% by weight of the food product coated. A food product such as crisp rice may be coated by dissolving the stearate in a carrier such as hard fat and then applying the stearate and fat blend while hot to the crisp rice. In the alternative, the rice may be first coated with fat and then the zinc stearate may be dusted onto the fat coated rice and heated. The stearate may also be incorporated directly into the food product without a carrier.

The novel features of the invention both as to the product and the method of making te product together with further objectives and advantages thereof will be better understood from the following description in which the presently preferred method and composition of the invention is set forth.

DETAILED DESCRIPTION OF THE INVENTION

The coating composition of the subject invention comprises a metal salt of stearic acid such as zinc stearate, calcium stearate, or magnesium stearate in a carrier of fat or oil. The stearate used should be a uniform fine particle powder of high purity and food grade quality. The carrier may be a hydrogenated or partially hydrogenated fat or oil such as those as will be disclosed in the forthcoming examples. Where the product itself can provide, or be the source of, the oil, as in some nuts, then the addition of the fat or oil becomes unnecessary, and the stearate need only be dusted on the product prior to heating. In certain cases, the stearate may simply be dusted on per se, or dispersed in a suitable carrier and sprayed on. The heating step found in each of the examples is important for achieving a continuous or substantially continuous film over or within the food product, whether the stearate is used as a coating on the food product or is incorporated directly into the food product. As a result, the temperature and time of heating should be closely controlled within the parameters set forth in order to achieve the necessary water insensitivity and repellant properties. The method and coating composition of the subject invention will become more evident from the following examples.

EXAMPLE I

In each of the experiments in the following table rice is heated in a pan coating apparatus. To the rice is added the oil and the mixture is agitated. After the rice becomes fully coated with the oil the zinc stearate is dusted onto the coated rice and then dried in an oven at 300° F. for seven minutes. A simple taste test showed no evidence of off flavors or added flavor.

|    | Rice  | Hydrogenated Fat | Zinc Stearate | Water Absorbed |
|----|-------|------------------|---------------|----------------|
| 1. | 500 g | 0                | 0             | 32 ml          |
| 2. | 500 g | 50 g             | 10 g          | 18 ml          |
| 3. | 500 g | 50 g             | 20 g          | 14 ml          |
| 4. | 500 g | 50 g             | 30 g          | 7 ml           |
| 5. | 500 g | 50 g             | 0             | 28 ml          |
| 6. | 500 g | 0                | 30 g          | 14 ml          |

The above samples were evaluated for water absorption properties. The greater the amount of water absorbed the less effective the coating properties seem to be. In this evaluation 10.8 grams of the coated rice is dispersed in 300 ml of water and stirred for five minutes. The solids are removed and the water volume noted. The difference noted in the water volume comprises an indication of the relative amounts of water absorption by the rice. Thus, samples 1 and 5 show the least degree of coating, therefore, a maximum water gain by the rice.

EXAMPLE II 250 g wheat flakes;
25 g hydrogenated palm oil;
10 g zinc stearate.

The wheat flakes were coated with the above ingredients using the method of Example I. The coated product was evaluated according to the method outlined in Example I. The control product, i.e., the uncoated wheat flakes, absorbed 35 ml of water in the evaluation method of Example I, while the test product, i.e., the coated product, absorbed 22 ml of water showing a relatively high degree of protection from moisture. No evidence of off taste or added tastes were noted.

EXAMPLE III 750 g granola mix;
75 g fat;
30 g zinc stearate.

The granola mix in this example was coated with zinc stearate in the same method as set forth in Example 1. The resulting coated product was insensitive to moisture. The taste of the resulting product appears unaffected.

EXAMPLE IV

Two grams of crisp rice coated as in Example I, sample No. 2 are mixed into cupcake batter mix. Two grams of uncoated crisp rice are also mixed into a cupcake batter mix for use as a control. The product is baked and tested for textural characteristics. The cupcakes containing the control uncoated rice tastes very gummy whereas the cupcakes containing the coated rice product is crunchy and firm, with no change in taste.

EXAMPLE V

Ice cream mixes are blended with crisp rice, both coated according to the subject invention and uncoated. The ice cream blend is immediately frozen. Twenty-four hours later the ice cream blend containing the coated rice is firm and crunchy whereas the control product having the uncoated crisp rice has lost its textural properties being gummy and gel-like. The taste of the ice cream having the coated rice is not different from that of a fresh batch of uncoated crispy rice and ice cream.

EXAMPLE VI

A granola bar mix is prepared according to the following:

| % | Ingredients |
|---|---|
| 5.5 | crisp rice |
| 8.0 | chocolate chips |
| 31.5 | syrup matrix |
| 52.5 | granola mix |
| Syrup Matrix | |
| 18.44 | corn syrup |
| 5.0 | sugar |
| 0.4 | salt |
| 2.7 | shortening |
| 3.6 | honey |
| 1.5 | water |

The dry mix was heated to 100 F. and mixed with syrup matrix which had been preheated to 170 F. The bars were formed as known in the art and evaluated for taste and texture. The bars containing coated rice at 5.5% level had a higher bulk density than control product containing 9% crisp rice. In fact, the granola bar mix prepared from the uncoated rice had one third less volume than that prepared from the coated bar. A granola bar mix having 9% uncoated rice is prepared according to the above recipe and procedure to form a control. The granola bars are formed, cooled and allowed to age for twenty-four hours. The granola bar containing the rice coated according to the subject invention is firm and crunchy whereas the control product has become gummy in that period of time. The taste of the granola bar did not appear to be affected by the coated crisp rice.

EXAMPLE VII

The following coated cereal samples are prepared by heating the rice, pouring melted fat into a pan until the rice is fully coated, adding the calcium stearate and drying in a 300° F. oven for seven minutes:

| | CEREAL | FAT | CALCIUM STEARATE |
|---|---|---|---|
| 7. | 500 g 102 Rice | 25 g 17D Fat (Durkee's Soy Base) | 20 g |
| 8. | 500 g 102 Rice | 50 g 17D Fat (Durkee's Soy Base) | 20 g |
| 9. | 500 g 102 Rice | 50 g 17D Fat (Durkee's Soy Base) | 30 g |
| 10. | 500 g 102 Rice | 50 g Paramount XX (Durkee's Palm Base) | 20 g |
| 11. | 500 g 102 Rice | 50 g 17D Fat | 10 g |
| 12. | 500 g 108 Rice | 25 g 17D Fat | 20 g |
| 13. | 500 g 108 Rice | 25 g 17D Fat | 10 g |
| 14. | 108 Rice | 25 g 17D Fat | 30 g |
| 15. | 250 g Grainfield Wheat Flakes | 25 g 17D Fat | 10 g |
| 16. | 250 g Natural Grain Granola | 75 g 17D Fat | 15 g |
| 17. | 750 g Natural Grain Granola | 75 g 17D Fat | 30 g |

In the following sample 35 grams of fat is first poured into the pan to coat the rice and then the calcium stearate is added to the coated rice. The remainder of the fat is then added to form double fat coating on the rice.

| | | | |
|---|---|---|---|
| 18. | 500 g 102 Rice | 50 g Paramount XX (Durkee's Palm Base) | 15 g |

In the following sample, the calcium stearate is mixed with a food-grade shellac and then the suspension is sprayed onto the fat coated rice:

| | | | |
|---|---|---|---|
| 19. | 500 g 102 Rice | 50 g 17D Fat | 10 g |

In the following sample, the rice is coated with 25 grams of fat addition to the pan and the zinc stearate is then added. The balance of the fat is mixed with the flavor and sprayed onto the coated rice to form a double coated rice product having the zinc stearate in the first coating and the flavor in the second and outer coating:

| 20. | 500 g | 102 Rice | 50 g | 17D Fat | 20 g |

One tablespoon of each of samples 2 through 20 coated as set forth above, is blended with four fluid ounces of vanilla ice cream and placed in a freezer set at 20° F. Each ice cream cup is hermetically sealed before being placed in the freezer. Control samples of four fluid ounces of vanilla ice cream with a tablespoon of crisp uncoated rice is likewise placed in a freezer in sealed containers. A "taste test" is conducted every forty-eight hours by taking a spoonful of each sample and comparing the texture of the coated cereal in each sample as compared to the uncoated control samples. In these tests, the uncoated control samples produces a soft, mushy cereal whereas each of the coated rice product samples produces a variety of firm and chewy textures comprising the cereal and the ice cream. In each taste test, no evidence of a taste attributable to the coating is found.

Moisture absorption tests are performed on sample no. 7 the above coated samples and compared to a control uncoated rice product according to the procedure outlined in Example I. Sample 7 is found to absorb 25 ml of water, while samples 8 and 10 absorb 12.5 ml of water. The control uncoated rice product absorbs 50 ml of water, which shows in comparison to the uncoated samples, a high resistance to the absorption of moisture as the result of coating with calcium stearate according to the subject invention. Each of samples 2-20 was also prepared with the use of zinc stearate. Tests identical to these set forth above yield identical reults.

The following examples, with duplicate ingredients and coating, and prepared according to the procedure utilized in preparing sample 4 of Example I, are subjected to a variety of times and temperatures in the baking step, as indicated.

|  | Rice | Hydro-genated Fat | Calcium Stearate | Temp. (°F.) | Time | Water Absorption |
| --- | --- | --- | --- | --- | --- | --- |
| 21. | 500 g | 50 g | 30 g | 250° | 7 min. | 31 ml |
| 22. | 500 g | 50 g | 30 g | 260° | 7 min. | 30 ml |
| 23. | 500 g | 50 g | 30 g | 265° | 7 min. | 12 ml |
| 24. | 500 g | 50 g | 30 g | 300° | 7 min. | 7 ml |
| 25. | 500 g | 50 g | 30 g | 325° | 7 min | 7 ml |
| 26. | 500 g | 50 g | 30 g | 350° | 7 min | 15 ml |
| 27. | 500 g | 50 g | 30 g | 375° | 7 min | 29 ml |

It becomes apparent that heating at about 265° F. and above for the required period of time is necessary to achieve a substantially continuous film over the food product. The preferred baking temperature is 275° F. to 350° F. Most preferred are temperatures in the range of 300° F.-325° F. The time required is that which is necessary to bring all components up to the required temperature. Thus, this time might vary with different ovens or different volumes bein baked. Further, baking temperatures higher than 350° F. tend to change the character of the food product at the baking times used and thus should be avoided. Temperatures higher than 350° F. applied to the stearate containing food product hastens rancidity of the resulting food product.

EXAMPLE VIII

Further studies are performed to show the relationship of the amount of water absorbed and the percentage by weight of calcium stearate coating.

|  | Crisp Rice | Hydro-genated Fat | Calcium Stearate (%) | Temp (°F.) | Time/Min 5/15/30 |
| --- | --- | --- | --- | --- | --- |
| 28. | 500 g | 50 g | 0.25 | 300° | 3.7/4.5/5.1 |
| 29. | 500 g | 50 g | 0.5 | 300° | 3.5/4.1/5.0 |
| 30. | 500 g | 50 g | 1.0 | 300° | 2.5/3.2/4.5 |
| 31. | 500 g | 50 g | 2.0 | 300° | 2.0/2.6/2.7 |
| 32. | 500 g | 50 g | 5.0 | 300° | 1.9/2.3/2.7 |
| 33. | 500 g | 50 g | 6.0 | 300° | .8/1.6/1.6 |
| 34. | 500 g | 50 g | 7.0 | 300° | .7/1.5/1.6 |
| 35. | 500 g | 50 g | 8.0 | 300° | .7/1.5/1.5 |
| 36. | 500 g | 50 g | 9.0 | 300° | .7/1.4/1.5* |
| 37. | 500 g | 50 g | 10.0 | 300° | .6/1.3/1.3* |
| 38. | 500 g | 50 g | 0 | 300° | 3.7/4.5/5.2 |

*Metallic soapy aftertaste

By examples 28-37 it can be seen that coatings of calcium stearate which are below 1.0% by weight would appear to be ineffective in providing moisture resistance to the crisp rice, while coatings of calcium stearate comprising percentages of the total weight over 8%, while effectively providing moisture resistance to the crisp rice, result in an undesirable metallic aftertaste, and are unacceptable for that reason. Thus, the range of acceptable amounts of calcium stearate would be 2%-8%, and preferably between 3-6% total weight. Zinc stearate and magnesium stearate are also found to be acceptable within such limits. It is expected that these limitations would hold true for most food products.

EXAMPLE IX

As a further example, calcium stearate was dusted onto raw macadamia nuts which were then heated at 360° F. for 8 minutes. Toasted macadamia nuts were likewise dusted and heated at 350° F. for 5 minutes. The coated nuts were placed with uncoated control nuts in a high humidity enclave at 75-80% R.H. After 48 hours, the coated product was firm and crunchy, but the uncoated product was soft and not crunchy. No off flavors or additional flavors were noted.

EXAMPLE X

Calcium stearate was dusted onto toasted coconuts which had first been heated and mixed with melted Durkee KCS fat. The dusted nuts were placed in an oven at 350° F. for 7 minutes alongside control nuts. The coated nuts were crisp and crunchy in water, while the control nuts were soft and soggy. No difference was noted in flavor.

With the above examples, it should be noted that the stearate may be applied in any number of ways such as being dusted onto fat coated rice, as in Examples 1 through 6 and then heated at temperatures above 265° F. or coated with a fat containing zinc stearate and then heated at temperatures above 265° F. as shown in Examples 7-20. In the alternative, if the product to be coated is capable of exuding oil upon heating or by other means it may only be necessary to dust the heated product with the stearate of choice. Thus, it is important to note that the invention comprises the application of a coating of a stearate such as calcium stearate, magnesium stearate or zinc stearate to the food product or the inclusion of such a stearate within the food product in a manner which obtains a substantially continuous film over or within the food product. By such a process, not only can grains be given the crunchy character of nuts, but this crunchy character can be retained over a longer period of time and in the presence of moisture as well. In addition, by the method and product of the subject invention food products containing a dual texture, such as liquid or semi-liquid products with crunchy nuggets contained therein, or ice cream with crunchy particles within is possible.

It should also be noted, as shown in Example XII, that the stearate provides for a lighter extrudate, as well as apparently lubricating the extrusion process for a more even extrusion flow with less screw wrap.

EXAMPLE XI

In the following example, crisp rice is coated with magnesium stearate in the manner set forth in Example IX. The coated rice is mixed with caramel prepared according to any of several recipes known in the art. The addition of the coated rice to the caramel provides a high bulk and a crunchy character with no off taste. When the caramel is mixed with uncoated rice, the mixture soon becomes soggy and loses its crunchy character entirely.

EXAMPLE XII

Haystacks were prepared according to the following recipe:

| Grams | Ingredient |
|---|---|
| 50 | granulated sugar |
| 25 | brown sugar |
| 100 | corn syrup |
| 60 | condensed milk |
| 20 | Paramount C crystals |
| 10 | butter |
| 1.5 | salt |

Mix the above ingredients thoroughly and heat to 248° F.; add the following:

| 20 | Invert sugar |
|---|---|
| 100 | Fondant |
| 1.5 ml | butterscotch flavor |
| 50 | crisp rice (coated with calcium stearate as in Example IX) |
| 80 | small pecan pieces |

Mix thoroughly while still hot and let cool. The haystack candy formed from the cooled mixture above was crunchy, firm and did not impart a gummy or off taste to the product. More coated crisp rice could be added and the amount of pecan pieces further decreased, with only minimal effects on taste and texture. Thus with more inexpensive coated rice and less costly pecan pieces, better cost control can be achieved without sacrificing quality.

Each of the above Examples I through XII shows no evidence of extraneous tastes being added to the product on coating by the composition and method of the subject invention with those exceptions noted. The taste can be affected greatly by the quality, nature and amount of the fat or oil used to initially coat the product. Thus, it is possible to achieve a different taste sensation by the selection of the fat or oil, as desired and as known in the art. Should no additional taste be desired then the oil or fat selected for use should be bland and substantially tasteless, as those used in the accompanying examples.

EXAMPLE XIII

Two pounds of calcium stearate are blended with 100 pounds of flour. The flour is formed of 95 parts wheat flour, 5 parts sucrose. The flour/stearate mixture is blended with water to yield a dough with a moisture content of 17%. The dough is heated in an extruder and forced through the extruder die orifice or opening where it is flash dried and toasted. An identical product was made without the addition of calcium stearate. The product to which calcium stearate was added had a less dense, i.e., more expanded product, experienced more uniform cutting at the die face, extruded easier with no screw wrap and provided a finished product which was water resistant. The control product, i.e., no stearate, absorbed water quickly to become soggy and difficult to extrude in an efficient manner.

EXAMPLE XIV

Two kg of fresh potato chips are placed in a pan of oil heated to 300° F. To the oil is added calcium stearate at a 4% level. The chips are removed, dried, and allowed to stand at 85° F. and 40% RH. After 24 hours, the product was still firm and crunchy, whereas the control (no stearates added) was soft and soggy.

EXAMPLE XV

Two kg. of extruded rice and corn blend are prepared with two percent calcium stearate as set forth in Example XIII. The extrudate is placed in a heated enrober and blended with 80 grams of heated fat. 80 grams of calcium stearate are dusted onto the fat coated extrudate and then the entire coated extrudate is heated to approximately 360° F. for one minute. With this procedure, a total of 8% calcium stearate is placed within and on the rice and corn product, the maximum permissible without the introduction of off-tastes, such as metallic, soapy tastes. When less than 2% total stearate is placed in and on the rice and corn product in this manner, unacceptably low moisture resistance is experienced, similar to when the product is only coated with the stearate at levels below 2% by weight. The finished product, however, having both internal and external stearates, is very hydrophobic, being so much so that it floats on water.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodimets falling within the scope of the appended claims.

We claim:

1. A solid food product having a substantially continuous moisture resistant coating consisting essentially of an alkaline metal salt of stearic acid, said alkaline metal salt of stearic acid being selected from the group consisting of zinc stearate, magnesium stearate, and calcium stearate, and said moisture resistant coating comprising from about 2% to about 8% by weight of the total food product weight, said food product having been heated to a temperature from about 265° F. to about 350° F.

2. The food product of claim 1 wherein the food product has a second coating selected from the group consisting of partially hydrogenated fat and partially hydrogenated oil.

3. The food product of claim 1 wherein said alkaline metal salt of stearic acid is dispersed in a edible carrier means.

4. The food product of claim 2 wherein said coating provides no additional taste to said food product.

5. The food product of claim 1 wherein the food product is selected from the group consisting of crisped rice, cereal grain flakes, granola mix, potato chips, corn chips, and nuts.

6. The food product of claim 1 wherein said alkaline metal salt of stearic acid is internally distributed throughout said food product as well as in said coating, said coating and the internal alkaline metal salt of stearic acid together comprising from about 2% to about 8% by weight of the total food product weight.

7. A food product having a first and a second component, said first component having a soft moist texture, said second component being a solid food item having a crunchy texture and being immersed in said first component, said second component having a coating of about 2% to about 8% by weight of the food product and consisting essentially of a stearate selected from the group consisting of zinc stearate, magnesium stearate and calcium stearate, said second component having been heated to a temperature between about 265° F. and about 350° F., said coating providing resistance to moisture in said first component and thereby retaining a dual texture in said food product for a longer period of time.

8. The food product of claim 7 whereby said stearate forms a substantially continuous film over said second component.

9. The food product of claim 7 wherein said second component comprises said stearate dusted over said food item and heated, said food item having previously been coated with an oil.

10. The food product of claim 7 wherein said second component is selected from the group consisting of crisp rice, wheat flakes, granola mix, potato chips, corn chips, and nuts.

11. The food product of claim 7 wherein said first component is selected from the group consisting of baked goods, ice cream and confections.

12. A method for preparing a food product having crunchy characteristics and which is resistant to moisture comprising the steps of:
  a. applying about 2% to about 8% by weight of a moisture resistance means to the food product, said moisture resistance means consisting essentially of a stearate selected from the group consisting of calcium stearate, zinc stearate and magnesium stearate to form a discontinuous film about said food product
  b. heating said food product to a temperature from 265° F. to 350° F. and for a time sufficient to form a substantially continuous film about said food product for retaining said crunchy characteristics in the presence of moisture, without affecting taste.

13. The method of claim 12 wherein prior to applying said stearate to said food product, said stearate is first mixed with a carrier means.

14. The method of claim 12 wherein said stearate is dusted onto the food product previously coated with a material selected from the group consisting of partially hydrogenated fats and partially hydrogenated oils.

15. The method of claim 13 wherein said stearate and carrier means mixture is sprayed onto said food product to form said coating.

16. The method of claim 12 further including the step of adding said coated food product to a second food product of dissimilar textural properties to form a dual texture food which will retain said dual texture over a long period of time.

17. The method of claim 12 wherein said food product contains said stearate as an internal ingredient prior to application of said coating, and the total amount of said stearate is 2% to 8% by weight of said food product.

* * * * *